Sept. 25, 1928.
A. R. THORNBLAD
PARACHUTE
Filed April 13, 1926
1,685,688
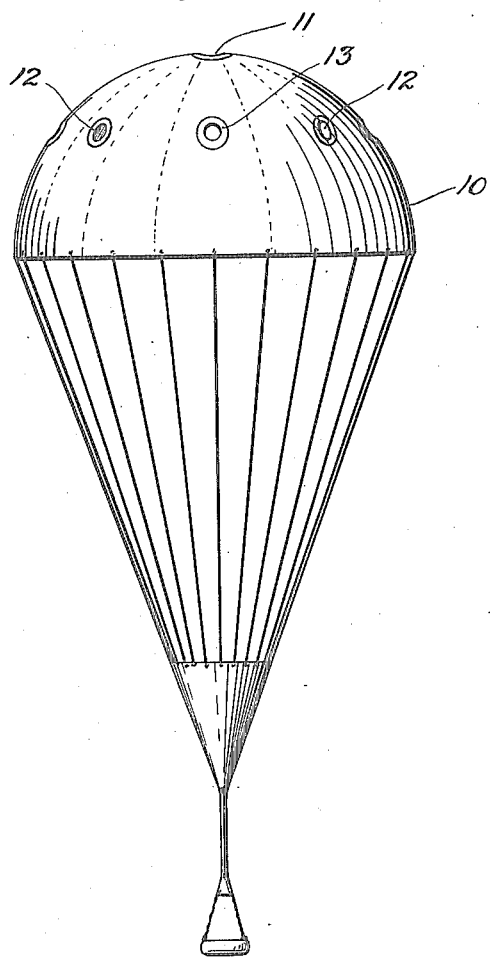
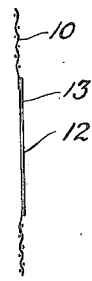
INVENTOR.
Axel Raoul Thornblad
BY
his ATTORNEY Patented Sept. 25, 1928.                                          1,685,688

UNITED STATES PATENT OFFICE.

AXEL RAOUL THÖRNBLAD, OF STOCKHOLM, SWEDEN, ASSIGNOR TO AKTIEBOLAGET FALLSKÄRM, OF STOCKHOLM, SWEDEN, A CORPORATION.

PARACHUTE.

Application filed April 13, 1926, Serial No. 101,819, and in Sweden April 14, 1925.

In descending with a parachute from an aerial vehicle it is of the utmost importance that the shock arising from the development of the parachute will not be too great, as in such case on the one hand the stresses on the body portion of the parachute may be so great that it will break with accompanying catastrophic consequences for the person jumping out, and on the other hand the person may be injured by a too great shock. Especially this fact will be of importance on descending from fast-going airplanes, which on falling may often attain very great velocities due to their small planes.

It has previously been proposed to provide one or more openings at the top of the body portion serving as outlets for the air below the parachute body when same assumes its open position, which outlet openings may be regulated to control the velocity on descending. Further it has also been proposed to provide outlet holes disposed at the side of the body portion and serving to control the lateral movements of said body portion during the descension. However, none of these arrangements previously known aimed at the object of the present invention and moreover such object could not be attained by any of them.

The present invention has for its object to provide means for decreasing the vacuum arising on the upper side of the body portion on descending with the parachute in order to insure a reliable decrease of the shock which arises when the parachute opens. The invention refers to parachutes, the body portion of which is provided with an outlet opening or openings and consists chiefly in the fact that the area of said opening or the total area of said openings is at least 0.2%, of the total area of the body portion of the parachute.

The above and other features of my invention will be evident from the following description in connection with the accompanying drawings, wherein:

Fig. 1 is a view of the parachute as extended, and

Fig. 2 is an enlarged detail of a single outlet opening and its resilient lining.

The parachute comprises the usual fabric body portion 10, which body portion contains an opening 11 at the top thereof, and a plurality of uniformly distributed openings 12 positioned in a plane below the top and parallel to the plane of the body portion base. Each opening 12 is lined with elastic material 13 of rubber or the like, for a purpose hereinafter described.

Experiences have shown that the shock which arises, when the parachute opens, will be essentially decreased when providing openings in the parachute body, the total area of which amounts to the value mentioned above. Preferably, said area is made somewhat greater, for instance 1 to 2% of the total area of the body portion. The opening or openings may be disposed within a zone of the body portion limited by two circles concentric with the lower edge of said body portion, the one circle at a distance of about 5% of the quarter of meridian from the top of the parachute body or from the edge of a central hole disposed at this place respectively and the other at a distance of about 10% of the quarter of meridian from the lower edge of said body portion.

The openings may preferably be circular, but evidently they may have any suitable shape. The object aimed at may also be attained by a sole slot or slit around the body portion, said slot being preferably disposed within the zone referred to above, for instance at the middle of the body portion or thereabout.

The reason why the shock arising when the parachute opens can be decreased in the manner set forth is, that on opening the air compressed within the parachute will act as an air cushion so that the air will be thrown out to the sides. Due to the fall a partial vacuum will arise behind the parachute body, said vacuum being considerably greater than the pressure of the compressed air within said body portion. The vacuum on the upper side of the body portion is not greatest at the top thereof, which might be imagined, but about at the middle of the spherical calotte formed by the body portion when expanded, and for this reason the openings, slits, slots or the like are preferably disposed around the centre circle of said calotte. It is also of importance that the openings, slits, slots or the like are suitably distributed over the total surface of the body portion of the parachute, for instance symmetrically along a circle around the top of said portion.

The lining around the openings may consist of elastic material, for instance rubber. Herewith the additional advantage will be gained that the openings will expand and permit a greater quantity of air to pass, when the pressure within the body portion or the vacuum on its upper side increases.

If a plurality of openings is used, the number of the openings should preferably be greater than four, that is to say, the centre angle between two openings should be less than 90°.

An arrangement according to the present invention allows a quick development of the parachute without the shock on opening becoming too great.

What I claim as new and desire to secure by Letters Patent of the United States of America is:—

A parachute having a single body portion provided with a plurality of outlet openings spaced circumferentially over the middle part of the surface of said body portion and having a total area of not less than 0.2% of the total area of said body portion, whereby the suction behind the body portion is utilized for decreasing the shock which arises when the parachute opens.

In testimony whereof I affix my signature.

AXEL RAOUL THÖRNBLAD.